US012347370B2

(12) United States Patent
Li et al.

(10) Patent No.: US 12,347,370 B2
(45) Date of Patent: Jul. 1, 2025

(54) COMPENSATION METHOD AND APPARATUS FOR DISPLAY DEVICE, AND STORAGE MEDIUM

(71) Applicants: Hefei BOE Joint Technology Co., Ltd., Anhui (CN); BOE Technology Group Co., Ltd., Beijing (CN)

(72) Inventors: Huihui Li, Beijing (CN); Wenchao Bao, Beijing (CN); Song Meng, Beijing (CN); Jingbo Xu, Beijing (CN); Miao Liu, Beijing (CN); Cheng Xu, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/275,228

(22) PCT Filed: Jul. 28, 2022

(86) PCT No.: PCT/CN2022/108673

§ 371 (c)(1),
(2) Date: Aug. 1, 2023

(87) PCT Pub. No.: WO2024/020943

PCT Pub. Date: Feb. 1, 2024

(65) Prior Publication Data

US 2025/0006121 A1 Jan. 2, 2025

(51) Int. Cl.

*G09G 3/32* (2016.01)
*G09G 3/3225* (2016.01)

(52) U.S. Cl.

CPC ............ *G09G 3/3225* (2013.01); *G09G 3/32* (2013.01); *G09G 2300/0819* (2013.01); (Continued)

(58) Field of Classification Search

CPC ... G09G 3/32–3291; G09G 2300/0819; G09G 2300/0842; G09G 2310/0243; (Continued)

(56) References Cited

U.S. PATENT DOCUMENTS

| | | | |
|---|---|---|---|
| 5,532,755 | A | 7/1996 | Patel et al. |
| 2014/0176516 | A1 | 6/2014 | Kim et al. |

(Continued)

FOREIGN PATENT DOCUMENTS

| | | | |
|---|---|---|---|
| CN | 1052838 | C | 5/2000 |
| CN | 101605346 | A | 12/2009 |

(Continued)

*Primary Examiner* — Nathan Danielsen
(74) *Attorney, Agent, or Firm* — XSENSUS LLP

(57) ABSTRACT

Provided is a compensation method for a display device. The method includes: acquiring first detection voltages of the plurality of subpixels during a first shutdown compensation process; acquiring first position indication information based on the first detection voltages of the plurality of subpixels; and determining first compensation data based on the first position indication information. The first position indication information indicates column positions of pixels to which a plurality of first subpixels of the plurality of subpixels belong. The first compensation data includes first threshold compensation voltages of the plurality of subpixels, and an absolute value of a difference between the first threshold compensation voltage of the first subpixel and a first reference value is less than an absolute value of a difference between a second threshold compensation voltage of the first subpixel in the first compensation data and the first reference value.

16 Claims, 6 Drawing Sheets

(52) U.S. Cl.
CPC ............... *G09G 2300/0842* (2013.01); *G09G 2320/0233* (2013.01); *G09G 2320/0295* (2013.01); *G09G 2320/045* (2013.01)

(58) Field of Classification Search
CPC ... G09G 2310/0248; G09G 2310/0251; G09G 2310/027–0275; G09G 2310/06; G09G 2310/08; G09G 2320/0233; G09G 2320/029; G09G 2320/0295; G09G 2320/043; G09G 2320/045; G09G 2330/02; G09G 2330/026; G09G 2330/027
See application file for complete search history.

(56) References Cited

U.S. PATENT DOCUMENTS

| | | | | |
|---|---|---|---|---|
| 2015/0187273 | A1* | 7/2015 | Chang .................. | G09G 3/3233 345/77 |
| 2015/0269895 | A1 | 9/2015 | Kao et al. | |
| 2019/0130837 | A1 | 5/2019 | Chen | |
| 2019/0189038 | A1 | 6/2019 | Park | |
| 2020/0104282 | A1 | 4/2020 | Bao et al. | |
| 2021/0074224 | A1 | 3/2021 | Wei et al. | |
| 2023/0206811 | A1* | 6/2023 | Kim ..................... | G09G 3/2003 345/690 |

FOREIGN PATENT DOCUMENTS

| | | | |
|---|---|---|---|
| CN | 103903561 | A | 7/2014 |
| CN | 104934015 | A | 9/2015 |
| CN | 105530512 | A | 4/2016 |
| CN | 105611330 | A | 5/2016 |
| CN | 107633810 | A | 1/2018 |
| CN | 107958347 | A | 4/2018 |
| CN | 108806609 | A | 11/2018 |
| CN | 109545113 | A | 3/2019 |
| CN | 109637445 | A | 4/2019 |
| CN | 109949748 | A | 6/2019 |
| CN | 111294652 | A | 6/2020 |
| CN | 111415611 | A | 7/2020 |
| CN | 112492295 | A | 3/2021 |
| CN | 112702653 | A | 4/2021 |
| CN | 112954316 | A | 6/2021 |
| CN | 114038428 | A | 2/2022 |
| CN | 114203111 | A | 3/2022 |
| CN | 114743499 | A | 7/2022 |
| JP | S61-290422 | A | 12/1986 |
| JP | H11-88784 | A | 3/1999 |

* cited by examiner

COMPENSATION METHOD AND APPARATUS FOR DISPLAY DEVICE, AND STORAGE MEDIUM

CROSS-REFERENCE TO RELATED APPLICATION

The present disclosure is a U.S. national stage of international application No. PCT/CN2022/108673, filed on Jul. 28, 2022, the content of which is herein incorporated by reference in its entirety.

TECHNICAL FIELD

The present disclosure relates to the field of display technologies, and in particular, relates to a compensation method and apparatus for a display device, and a storage medium

BACKGROUND

For a better display quality, a display device needs to compensate a threshold voltage of a drive thin film transistor.

SUMMARY

Some embodiments of the present disclosure provide a compensation method and apparatus for a display device, and a storage medium. The technical solutions are as follows.

According to some embodiments of the present disclosure, a compensation method for a display device is provided. The display device includes a plurality of detection lines and a plurality of pixels arranged in arrays, wherein each of the detection lines is connected to a column of pixels of the plurality of pixels, and each of the pixels includes a plurality of subpixels. The method includes: acquiring first detection voltages of the plurality of subpixels during a first shutdown compensation process; acquiring first position indication information based on the first detection voltages of the plurality of subpixels, wherein the first position indication information indicates column positions of pixels to which a plurality of first subpixels of the plurality of subpixels belong, wherein the plurality of first subpixels are connected to a first detection line of the plurality of detection lines, and an absolute value of a difference between the first detection voltage of any of the plurality of first subpixels and a first detection voltage of a second subpixel is greater than a first threshold, the second subpixel being a subpixel connected to a second detection line adjacent to the first detection line; and determining first compensation data based on the first position indication information, wherein the first compensation data includes first threshold compensation voltages of the plurality of subpixels, and an absolute value of a difference between the first threshold compensation voltage of the first subpixel in the first compensation data and a first reference value is less than an absolute value of a difference between a second threshold compensation voltage of the first subpixel and the first reference value, the first reference value being a threshold voltage of a drive thin film transistor of the first subpixel, and the second threshold compensation voltage of the first subpixel being calculated based on the first detection voltage of the first subpixel.

In some embodiments, acquiring the first position indication information based on the first detection voltages of the plurality of subpixels includes: in response to absolute values of differences between a first detection voltage of a first target subpixel and first detection voltages of two second target subpixels being both greater than the first threshold, determining a column position of a pixel to which the first target subpixel belongs as the first position indication information, wherein the first target subpixel is any of the plurality of subpixels, pixels to which the two second target subpixels belong and the pixel to which the first target pixel belongs are in a same row, and the two second target subpixels are respectively connected to two detection lines adjacent to the first detection line.

In some embodiments, the method further includes: acquiring second detection voltages of the plurality of subpixels during a second shutdown compensation process, wherein the second shutdown compensation process follows the first shutdown compensation process; in response to absolute values of differences between a second detection voltage of a third target subpixel and second detection voltages of two fourth target subpixels being both greater than a second threshold, determining a column position of a pixel to which the third target subpixel belongs as second position indication information, wherein the third target subpixel is any of the plurality of subpixels, the third target subpixel is connected to a third detection line of the plurality of detection lines, pixels to which the two fourth target subpixels belong and the pixel to which the third target subpixel belongs are in a same row, the two fourth target subpixels are respectively connected to two detection lines adjacent to the third detection line, and the second threshold is less than the first threshold; and determining second compensation data based on the second position indication information, wherein the second compensation data includes third threshold compensation voltages of the plurality of subpixels, and an absolute value of a difference between a third threshold compensation voltage of the third target subpixel in the second compensation data and a second reference value is less than an absolute value of a difference between a fourth threshold compensation voltage of the third target subpixel and the second reference value, the second reference value being a threshold voltage of a drive thin film transistor of the third target subpixel, and the fourth threshold compensation voltage of the third target subpixel being calculated based on the second detection voltage of the third target subpixel.

In some embodiments, the method further includes: setting the second threshold in response to a setting instruction, wherein the setting instruction is received by a remote control device or a button of the display device.

In some embodiments, acquiring the first position indication information based on the first detection voltages of the plurality of subpixels includes: determining third compensation data based on the first detection voltages of the plurality of subpixels; controlling, based on the third compensation data and image data of a target image, the display device to display the target image; and acquiring the first position indication information in response to a user instruction, wherein the user instruction is generated based on a position of a luminance anomaly line in the target image.

In some embodiments, acquiring the first position indication information in response to the user instruction includes: moving a cursor in the target image in response to a user operation; and receiving the user instruction, wherein the user instruction indicates that a position of a subpixel corresponding to the cursor is determined as the first position indication information.

In some embodiments, determining the first compensation data based on the first position indication information includes: determining the first threshold compensation voltage of the first subpixel by any of: calculating the first threshold compensation voltage of the first subpixel according to a first detection voltage of a subpixel which is in a same row as the first subpixel and connected to a detection line adjacent to the first detection line; calculating the first threshold compensation voltage of the first subpixel, according to an average value of first detection voltages of at least two subpixels that are in a same row as the first subpixel and connected to at least two detection lines adjacent to the first detection line; determining a first threshold compensation voltage of a subpixel, which is in a same row as the first subpixel and connected to a detection line adjacent to the first detection line, as the first threshold compensation voltage of the first subpixel; determining an average value of first threshold compensation voltages of at least two subpixels, which are in a same row as the first subpixel and connected to at least two detection lines adjacent to the first detection line, as the first threshold compensation voltage of the first subpixel; or determining a third threshold compensation voltage of the first subpixel during a third shutdown compensation process as the first threshold compensation voltage of the first subpixel, wherein the third shutdown compensation process is prior to the first shutdown compensation process, and an absolute value of a difference between a third threshold compensation voltage of the first subpixel upon the third shutdown compensation process and the first reference value is less than the absolute value of the difference between the second threshold compensation voltage of the first subpixel and the first reference value.

According to some embodiments of the present disclosure, a compensation method for a display device is provided. The display device includes a plurality of detection lines and a plurality of pixels arranged in arrays, each of the detection lines being connected to a column of pixels of the plurality of pixels, and each of the pixels including a plurality of subpixels. The method includes: acquiring first compensation data, wherein the first compensation data is acquired by the display device in a first shutdown compensation process, and the first compensation data includes first threshold compensation voltages of a plurality of first subpixels and first threshold compensation voltages of a plurality of second subpixels, wherein the plurality of first subpixels are connected to a first detection line, and the plurality of second subpixels are connected to a second detection line adjacent to the first detection line, an absolute value of a difference between the first threshold compensation voltage of the first subpixel and the first threshold compensation voltage of the second subpixel being greater than a voltage threshold; acquiring position indication information, wherein the position indication information indicates column positions of pixels to which the plurality of first subpixels belong; and acquiring second display data by compensating, based on the position indication information and the first compensation data, first display data of an image to be displayed, wherein the first display data includes first data voltages of the plurality of subpixels, and the second display data includes second data voltages of the plurality of subpixels, in the second display data, an absolute value of a difference between a second data voltage of the first subpixel and a first data voltage of the first subpixel being less than an absolute value of the first threshold compensation voltage.

In some embodiments, the method further includes: during the first shutdown compensation, in response to absolute values of differences between a detection voltage of a first target subpixel and detection voltages of two second target subpixels being both greater than a threshold, saving a column position of a pixel to which the first target subpixel belongs as the position indication information, wherein pixels to which the two second target subpixels belong are in a same row as the pixel to which the first target subpixel belongs, and the two second target subpixels are connected to two detection lines adjacent to the first detection line; or generating the position indication information in response to a user instruction, wherein the user instruction is generated according to a position of a luminance anomaly line in a target image, the target image being an image displayed by the display device upon the first shutdown compensation process.

In some embodiments, compensating, based on the position indication information and the first compensation data, the first display data of the image to be displayed includes: determining the second data voltage of the first subpixel by any of: acquiring the second data voltage of the first subpixel by compensating the first data voltage of the first subpixel using a first threshold compensation voltage of a subpixel which is in a same row as the first subpixel and connected to a detection line adjacent to the first detection line; acquiring the second data voltage of the first subpixel by compensating the first data voltage of the first subpixel using a second threshold compensation voltage of the first subpixel, wherein the second threshold compensation voltage of the first subpixel is acquired by the display device in a second shutdown compensation process, the second shutdown compensation process being prior to the first shutdown compensation process, and during a process of compensation by the display device using second compensation data, luminance anomaly lines are not generated at positions corresponding to the pixels to which the plurality of first subpixels belong.

According to some embodiments of the present disclosure, a compensation apparatus for a display device is provided. The apparatus includes one or more processors and one or more memories, wherein the one or more memories store at least one program code therein, wherein the at least one program code, when loaded and executed by the one or more processors, causes the one or more processors to perform the compensation method as described above.

According to some embodiments of the present disclosure, a non-volatile computer-readable storage medium is provided. The non-volatile computer-readable storage medium stores at least one computer program therein, wherein the at least one computer program, when loaded and run on a computer, causes the computer to perform the compensation method as described above.

According to some embodiments of the present disclosure, a computer program product is provided. The computer program product includes one or more instructions, wherein the one or more instructions, when loaded and executed on a computer, cause the computer to perform the compensation method as described above.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

The present disclosure is described in further detail with reference to the accompanying drawings, to clearly present the objects, technical solutions, and advantages of the present disclosure.

For ease of facilitating the understanding of the embodiments of the present disclosure, the pixel structure of the display device and the shutdown compensation process are first briefly described hereinafter.

A display region of the display device includes a plurality of pixels arranged in arrays. Each of the pixels includes a plurality of subpixels, and the plurality of subpixels are configured to emit light of different colors. For example, each of the pixels includes three subpixels, and the three subpixels are respectively configured to emit red (R) light, blue (B) light, and green (G) light. Another example is that each of the pixels includes four subpixels, which are respectively configured to emit red, blue, green, and white light. Each of the subpixels includes a light-emitting element and a pixel drive circuit. The pixel drive circuit and the light-emitting element in the same subpixel are connected to each other. The pixel drive circuit is configured to drive the connected light-emitting element to emit light. By controlling the color and luminance of the light emitted by each of the pixels, the display device is capable of displaying corresponding images.

The light-emitting element has a variety of structures, which are selected according to actual needs. For example, the light-emitting element is an organic light-emitting diode (OLED), a quantum dot light-emitting diode (QLED), or a micro light-emitting diode (Micro-LED).

Figure 1:
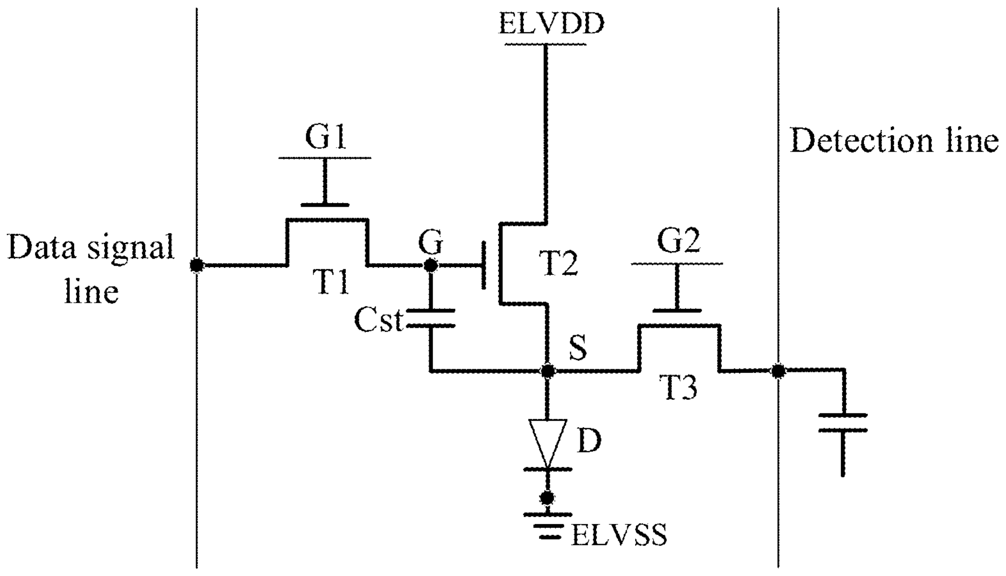
FIG. 1 is a structural schematic diagram of a pixel drive circuit.

FIG. 1 is a structural schematic diagram of a pixel drive circuit. As illustrated in FIG. 1, the pixel drive circuit includes a switch thin film transistor (TFT) T1, a drive TFT T2, a capacitor Cst, and a light-emitting element D. A gate of the switch TFT T1 is connected to a first scan signal line G1, a source of the switch TFT T1 is connected to a data signal line, and a drain of the switch TFT T1 is connected to a gate of the drive TFT T2. A source of the drive TFT T2 is connected to a first power supply line ELVDD, and a drain of the drive TFT T2 is connected to an anode of the light-emitting element D. A cathode of the light-emitting element D is connected to a second power supply line ELVSS. One terminal of the capacitor Cst is connected to the drain of the switch TFT T1 and the gate of the drive TFT T2, and the other terminal of the capacitor Cst is connected to the drain of the drive TFT T2 and the anode of the light-emitting element D.

It should be noted that FIG. 1 gives the description using a 2T1C (i.e., 2 TFTs and 1 capacitor) circuit as an example, and in other embodiments, the number of TFTs and capacitors and the connection relationship therebetween in the pixel drive circuit are adjusted according to actual needs, as long as the pixel drive circuit drives the light-emitting element to emit light.

Because a threshold voltage of the drive TFT T2 changes during the use of the display device, to avoid the change from affecting a display effect of the display device, a shutdown compensation process is performed periodically and compensation data is updated, and the threshold voltage of the drive TFT of the display device is compensated using the updated compensation data. The compensation data includes a threshold compensation voltage corresponding to each of the subpixels. Upon completion of the shutdown compensation process, the threshold compensation voltage corresponding to each of the subpixels is closer to the threshold voltage of the drive TFT in the corresponding pixel drive circuit.

In the embodiments of the present disclosure, the shutdown compensation indicates that the display device detects a voltage of a node S (i.e., a connection point of the drain of the drive TFT T2, the drain of the light-emitting element D, and the capacitor Cst) in the pixel drive circuit using a detection circuit connected to a detection line at the time of shutdown, and then calculates the threshold compensation voltage based on a detection voltage acquired from the detection, and compensates the threshold voltage of the drive TFT T2 based on the calculated threshold compensation voltage at the time of power-on.

For the shutdown compensation, the pixel drive circuit in FIG. 1 further includes a detection TFT T3. A gate of the detection TFT T3 is connected to a second scan signal line G2, a source of the detection TFT T3 is connected to the node S, and a drain of the detection TFT T3 is connected to the detection line. Typically, a plurality of pixels in the same column are connected to the same detection line.

In practice, TFTs in pixel drive circuits of some subpixels have defective processing points, and these subpixels perform normal displays when leaving the factory. However, as the display device is used for a longer period, the pixel drive circuit has a short circuit with the detection line. For example, a film layer, where the gate of the detection TFT T3 of the pixel drive circuit is disposed, has a short circuit with the detection line. When the short circuit occurs between the pixel drive circuit and the detection line, the detection voltage detected by the detection line is abnormally large or small, and the threshold compensation voltage calculated based on the detection voltage is also abnormally large or small, causing the pixel to be abnormal. Because pixel drive circuits of pixels in the same column share a single detection line, an abnormal detection voltage of one of the subpixels causes abnormal detection voltages of all of the subpixels connected to this detection line, such that the threshold compensation voltage calculated based on the detection voltage is also abnormal.

Upon the shutdown compensation, the abnormal threshold compensation voltage is manifested as a luminance anomaly line in an image displayed by the display device. The luminance anomaly line herein, which is also referred to as a defective line, is a column of pixels whose luminance is abnormal when the display device is lit, and the luminance anomaly herein indicates that the luminance is higher or lower than other regions. For example, in the case that a short circuit occurs between the detection line and the first power supply line, the detection voltage detected by the detection line is large, and the threshold compensation voltage calculated based on the detection voltage is small. In this case, the luminance of the luminance anomaly line is lower than the luminance of other regions, and the luminance anomaly line is referred to as a dark line. In the case that a short circuit occurs between the detection line and the second power supply line, the detection line detection voltage is small, and the threshold compensation voltage calculated based on the detection voltage is large. In this case, the luminance of the luminance abnormal line is higher than the luminance of other regions, and the luminance abnormal line is referred to as a bright line.

Figure 2:
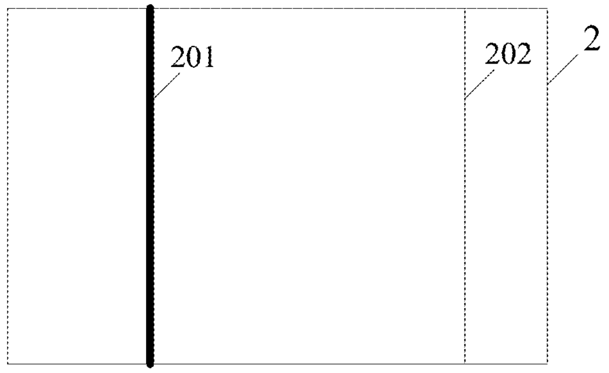
FIG. 2 is a schematic diagram of a target image that has a luminance anomaly line according to some embodiments of the present disclosure.

FIG. 2 is a schematic diagram of a target image that has a luminance anomaly line according to some embodiments of the present disclosure. As illustrated in FIG. 2, a luminance anomaly line 201 and a luminance anomaly line 202 are manifested in a target image 2. The luminance anomaly line 201 indicates that a short circuit occurs between the detection line of the subpixel and the second power supply line of the pixel drive circuit, and the luminance anomaly line 201 is a bright line. The luminance anomaly line 202 indicates a short circuit occurs between the detection line of the subpixel and the first power supply line of the pixel drive circuit, and the luminance anomaly line 201 is a dark line.

In the case that the luminance abnormal line is caused by a short circuit between the detection line and the pixel drive circuit, the acquired compensation data is still abnormal even if the shutdown compensation is performed again. Therefore, the luminance abnormal line still appears when the compensation data is used to compensate the corresponding subpixel upon boot up. At this time, the common approach is to seek help from customer service or send the display device directly for repair, which has a long repair cycle.

The embodiments of the present disclosure provide a compensation method for a display device. During the shutdown compensation process, the detection voltages of the plurality of subpixels are acquired, and the position indication information of the luminance abnormal line is acquired based on the detection voltages. The compensation data is determined based on the position indication information of the luminance abnormal line, and the threshold voltage of the drive TFT of the subpixel corresponding to the luminance abnormal line is determined as a reference value. An absolute value of a difference between the threshold compensation voltage of the subpixel corresponding to the luminance abnormal line and the reference value is caused to be less than an absolute value of a difference between the threshold compensation voltage calculated based on the detection voltage of the subpixel corresponding to the luminance abnormal line and the reference value.

Figure 3:
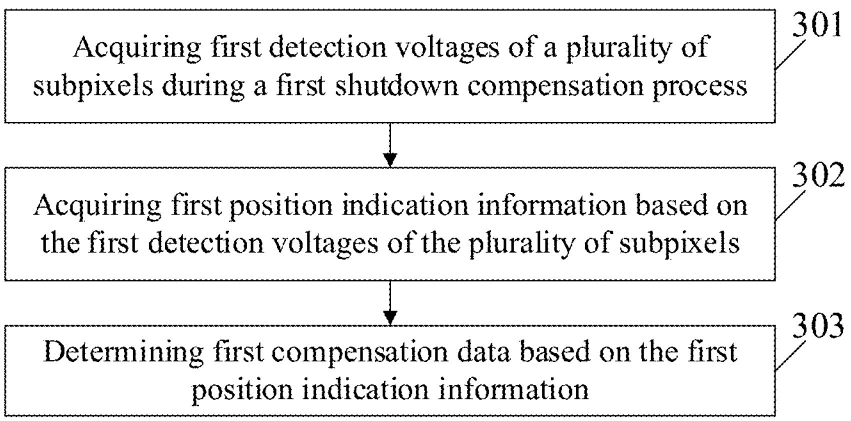
FIG. 3 is a flowchart of a compensation method for a display device according to some embodiments of the present disclosure.

FIG. 3 is a flowchart of a compensation method for a display device according to some embodiments of the present disclosure. Referring to FIG. 3, the method is performed by a control unit, such as a time controller (TCON), of the display device. The method includes the following steps.

In step 301, first detection voltages of a plurality of subpixels are acquired during a first shutdown compensation process.

The plurality of subpixels herein are all subpixels in a display region of the display device, and the first detection voltage is a voltage output by a detection line connected to each of the subpixels, i.e., the voltage of the node S.

In some embodiments, the first shutdown compensation process is performed in response to a received user instruction. The user instruction indicates an execution of the shutdown compensation process, and is received from a remote control device or a button on the display device.

In step 302, first position indication information is acquired based on the first detection voltages of the plurality of subpixels.

The first position indication information indicates column positions of pixels to which a plurality of first subpixels in the plurality of subpixels belong. The plurality of first subpixels are connected to a first detection line, and an absolute value of a difference between the first detection voltage of any of the plurality of first subpixels and a first detection voltage of a second subpixel is greater than a first threshold. The second subpixel is a subpixel connected to a second detection line adjacent to the first detection line.

It should be noted that in some embodiments of the present disclosure, the pixels corresponding to the first position indication information is a column of pixels or a plurality of columns of pixels, and the pixel to which the first subpixel belongs is a column of abnormal pixels or any column of a plurality of columns of abnormal pixels.

In some embodiments, the row is an extension direction of a scan line, and the column is an extension direction of a data line and a detection line. In some embodiments, the row is a horizontal direction, and the column is a vertical direction. In other embodiments, the row is the vertical direction, and the column is the horizontal direction.

In step 303, first compensation data is determined based on the first position indication information.

The first compensation data includes first threshold compensation voltages of the plurality of subpixels. In the first compensation data, an absolute value of a difference between the first threshold compensation voltage of the first subpixel and a first reference value is less than an absolute value of a difference between a second threshold compensation voltage of the first subpixel and the first reference value. The first reference value is a threshold voltage of a drive TFT of the first subpixel, and the first subpixel second threshold compensation voltage is calculated based on the first detection voltage of the first subpixel.

In some embodiments, the first compensation data is saved in a control board of the display device, such as being saved in the TCON of the display device.

In some embodiments, the first position indication information is acquired based on the first detection voltage during the first shutdown compensation. The first position indication information indicates the column positions of the pixels to which the plurality of first subpixels of the plurality of subpixels belong, and the absolute value of the difference between the first detection voltage of the first subpixel and the first detection voltage of the second subpixel adjacent to the first subpixel is greater than the first threshold, which indicates that the first detection voltage of the first subpixel corresponding to the first position indication information is most probably abnormal. The abnormality of the first detection voltage of the first subpixel causes the second threshold compensation voltage calculated based on the first detection voltage of the first subpixel corresponding to the first position indication information to be also abnormal. That is, the second threshold compensation voltage is much different from the threshold voltage of the drive TFT of the first subpixel. In the case that the second threshold compensation voltage is employed to perform the threshold compensation on the first subpixel corresponding to the first position indication information, the luminous intensity of the column of subpixels to which the first subpixel belong is larger or smaller, which appears as a bright line or a dark line in the display image.

However, in the embodiments of the present disclosure, the first threshold compensation voltage is determined based on the first position indication information, and the absolute value of the difference between the first threshold compensation voltage and the first reference value is less than the absolute value of the difference between the second threshold compensation voltage and the first reference value, such that the first threshold compensation voltage is closer to the first reference value relative to the second threshold compensation voltage. That is, the first threshold compensation voltage is closer to the threshold voltage of the drive TFT in the first subpixel relative to the second threshold compensation voltage. Therefore, the influence of the threshold voltage of the drive TFT in the first subpixel on the luminous intensity of the first subpixel is better eliminated by using the first threshold compensation voltage to compensate the first subpixel corresponding to the first position indication information, which is conducive to improving the display quality.

Figure 4:
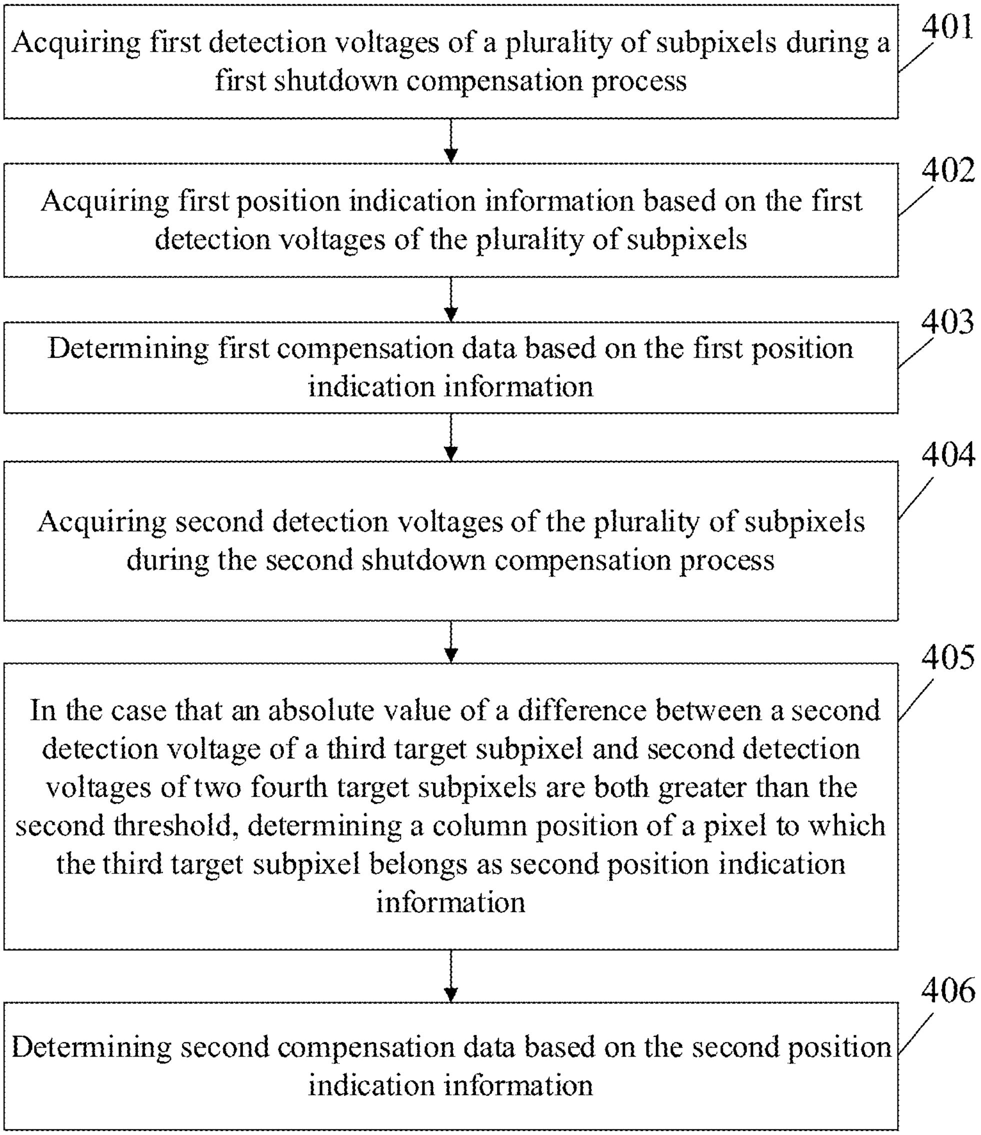
FIG. 4 is a flowchart of another compensation method for a display device according to some embodiments of the present disclosure.

FIG. 4 is a flowchart of another compensation method for a display device according to some embodiments of the present disclosure. Referring to FIG. 4, the method is performed by a control unit, such as a TCON, of the display device. The method includes the following steps.

In step 401, first detection voltages of a plurality of subpixels are acquired during a first shutdown compensation process.

For the meanings of the first shutdown compensation process, the plurality of subpixels, and the first detection voltage herein, reference may be made to the descriptions in step 301, which are not repeated herein.

In step 402, first position indication information is acquired based on the first detection voltages of the plurality of subpixels.

For the meaning of the first position indication information herein, reference may be made to the description in step 301, which is not repeated herein.

In some possible embodiments, the first position indication information is acquired according to the following approaches.

In the case that an absolute value of a difference between a first detection voltage of a first target subpixel and first detection voltages of two second target subpixels are both greater than a first threshold, a column position of a pixel to which the first target subpixel belongs is determined as the first position indication information.

The first target subpixel is any of the plurality of subpixels. Further, the first target subpixel is any of the plurality of first subpixels. Pixels to which the two second target subpixels belong are in the same row as the pixel to which the first target subpixel belongs, and the two second target subpixels are respectively connected to two detection lines adjacent to the first detection line.

Exemplarily, because subpixels emitting light of the same color in the same row are successively scanned during the shutdown compensation process, the first target subpixel and the second target subpixel are subpixels emitting the light of the same color. For example, assuming that each pixel includes three subpixels R, G, and B, detection voltages of all the R subpixels are acquired first, then detection voltages of all the G subpixels are acquired, and finally, detection voltages of all the B subpixels are acquired.

In some embodiments, the first threshold is set in response to a setting instruction, which is received through a remote control device or a button of the display device. Exemplarily, the remote control device includes a remote control or a terminal. In other embodiments, the first threshold is a default value.

In step 403, first compensation data is determined based on the first position indication information.

Step 403 includes: determining a first threshold compensation voltage of the first subpixel using either of the following approaches.

In a first approach, the first threshold compensation voltage of the first subpixel is calculated based on a first detection voltage of a subpixel which is in the same row as the first subpixel and connected to a detection line adjacent to the first detection line. For example, the first threshold compensation voltage of the first subpixel is calculated based on a first detection voltage of a subpixel which is in the same row as the first subpixel and connected to a prior detection line adjacent to the first detection line or a following detection line adjacent to the first detection line.

In a second approach, the first threshold compensation voltage of the first subpixel is calculated based on an average value of first detection voltages of at least two subpixels that are in the same row as the first subpixel and connected to at least two detection lines adjacent to the first detection line. For example, the first threshold compensation voltage of the first subpixel is calculated based on an average value of first detection voltages of a prior subpixel and a following subpixel that are in the same row as the first subpixel and connected to two detection lines adjacent to the first detection row.

In a third approach, a first threshold compensation voltage of a subpixel which is in the same row as the first subpixel and connected to a detection line adjacent to the first detection line is determined as the first threshold compensation voltage of the first subpixel. For example, a first threshold compensation voltage of a subpixel which is in the same row as the first subpixel and connected to a prior detection line adjacent to the first detection line or a following detection line adjacent to the first detection line is determined as the first threshold compensation voltage of the first subpixel.

In a fourth approach, an average value of first threshold compensation voltages of at least two subpixels that are in the same row as the first subpixel and connected to at least two detection lines adjacent to the first detection line is determined as the first threshold compensation voltage of the first subpixel. For example, an average value of first threshold compensation voltages of a prior subpixel and a following subpixel that are in the same row as the first subpixel and connected to the two detection lines adjacent to the first detection line is determined as the first threshold compensation voltage of the first subpixel.

In a fifth approach, a third threshold compensation voltage of the first subpixel during a third shutdown compensation process is determined as the first threshold compensation voltage of the first subpixel. The third shutdown compensation process is prior to the first shutdown compensation process, and an absolute value of a difference between the third threshold compensation voltage of the first subpixel upon the third shutdown compensation process and a first reference value is less than an absolute value of a difference between a second threshold compensation voltage of the first subpixel and the first reference value.

In this way, the first subpixel is compensated using the first compensation data during the subsequent display of the display device.

As described above, subpixels emitting light of the same color in the same row are successively scanned during the shutdown compensation process, and thus in the above approaches, the first subpixel and the subpixel which is in the same row as the first subpixel and connected to the detection line adjacent to the first detection line are subpixels of the same color.

Figure 5:
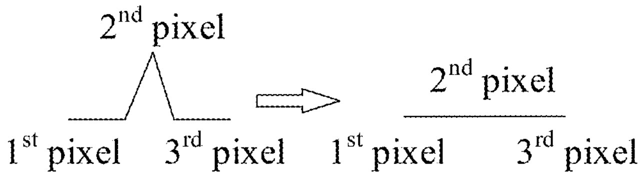
FIG. 5 is a schematic diagram of updating compensation data according to some embodiments of the present disclosure.

FIG. 5 is a schematic diagram of updating compensation data according to some embodiments of the present disclosure. As illustrated in FIG. 5, differences between a detection voltage of a second subpixel and detection voltages of a first subpixel and a third subpixel that are adjacent to the second subpixel are both greater than the first threshold, and thus the detection voltage of the second subpixel is determined to be abnormal. The detection voltage of the adjacent first subpixel or the third subpixel is determined as the detection voltage of the second subpixel, such that the detection voltage of the second subpixel is equal to the detection voltage of the first subpixel and the detection voltage of the third subpixel, and thus first compensation data of the second subpixel calculated based on the detection voltage is also equal to first compensation data of the first subpixel and first compensation data of the third subpixel.

In some embodiments, step 403 further includes: for subpixels other than the first subpixel, calculating first threshold compensation voltages of the other subpixels based on the first detection voltages of the other subpixels.

In the embodiments of the present disclosure, upon the completion of the first shutdown compensation process, the display device displays at least one test image. In some embodiments, the test image is a solid color image, which facilitates the highlighting of the luminance anomaly line.

In some embodiments, the number of test images is equal to the number of subpixels included in one pixel, and the test images and the subpixels have the same color. For example, in the case that a subpixel includes three subpixels, a red subpixel, a blue subpixel, and a green subpixel, the display device displays three test images, a red image, a blue image, and a green image, at the end of the first shutdown compensation process. In other embodiments, the test image is an image having an arbitrary pattern or, an image having a different color from the subpixel.

In the case that the luminance anomaly line is not present in any of the test images, the effect of compensating all the subpixels of the display device using the first compensation data is great, and the threshold compensation is performed using this first compensation data for a subsequent period.

In the case the luminance anomaly line is still present in either of the test images, the effect of compensating all the subpixels of the display device using the first compensation data does not satisfy the demand, and a second shutdown compensation process is performed at this time in response to a user instruction. In this case, the method further includes the following steps.

In step 404, second detection voltages of the plurality of subpixels are acquired during the second shutdown compensation process.

The second shutdown compensation process follows the first shutdown compensation process.

In step 405, in the case that an absolute value of a difference between a second detection voltage of a third target subpixel and second detection voltages of two fourth target subpixels are both greater than the second threshold, a column position of a pixel to which the third target subpixel belongs is determined as second position indication information.

The third target subpixel herein is any one of the plurality of subpixels. The third target subpixel is connected to a third detection line, pixels to which the two fourth target subpixels belong are in the same row as the pixel to which the third target subpixel belongs, and the two fourth target subpixels are respectively connected to two detection lines adjacent to the third detection line. The second threshold is less than the first threshold. By reducing the first threshold, the position of the luminance anomaly line is easily to be determined based on the detection voltage and the second threshold.

In some embodiments, the third target subpixel and the first target subpixel are the same or different.

In some embodiments, a value of the second threshold is determined in response to the setting instruction entered by the user. For example, the setting instruction directly indicates the value of the second threshold, or the setting instruction indicates that the second threshold is acquired by reducing the first threshold by a defined percentage (e.g., 30% of the first threshold) or by reducing a defined difference. Accordingly, the method further includes: setting the second threshold in response to the setting instruction. The setting instruction is received by a remote control device or a button of the display device. Exemplarily, the setting instruction is received prior to the beginning of the second shutdown compensation process.

In some embodiments, the second threshold is determined automatically based on the first threshold in the case that an interval between the two shutdown compensation processes is less than a time threshold. For example, the second threshold is acquired by reducing the first threshold by a defined percentage or a defined difference.

In step 406, second compensation data is determined based on the second position indication information.

The second compensation data herein includes third threshold compensation voltages of the plurality of subpixels. In the second compensation data, an absolute value of a difference between a third threshold compensation voltage of the third target subpixel and a second reference value is less than an absolute value of a difference between a fourth threshold compensation voltage of the third target subpixel and the second reference value. The second reference value is a threshold voltage of a drive TFT of the third target subpixel. The fourth threshold compensation voltage of the third target subpixel is calculated based on the second detection voltage of the third target subpixel.

The second compensation data is determined in step 406 in the same way as the first compensation data is determined in step 403, which is not repeated herein.

Upon the completion of the second shutdown compensation process, in the case that the luminance anomaly line is still present in the test image displayed, a fourth shutdown compensation process is performed in response to a user instruction. The process of the fourth shutdown compensation is the same as the process of the second shutdown compensation. The third threshold in the fourth shutdown compensation process is smaller than the second threshold. For the relationship between the third threshold and the second threshold, reference is made to the relationship between the second threshold and the first threshold described previously, which is not repeated herein.

Upon completion of the second shutdown compensation process, in the case that the number of luminance abnormal lines appearing in the test image increases, the luminance abnormal lines are not caused by a short circuit in the detection line, which needs to be fed back to the customer service for processing.

In the embodiments of the present disclosure, in the case that the absolute value of the difference between the detection voltage of the first subpixel and the detection voltages of two subpixels connected to two detection lines adjacent to the first detection line is greater than the threshold, the position indication information of the luminance abnormal line is determined. This approach of determining the position indication information of the luminance anomaly line is simple and has small computational complexity.

In addition, in the case that the luminance abnormal line is still present in the display image upon the completion of the shutdown compensation process, the threshold is reduced and the shutdown compensation process is performed again, such that the probability of repairing the luminance abnormal line is further increased.

Figure 6:
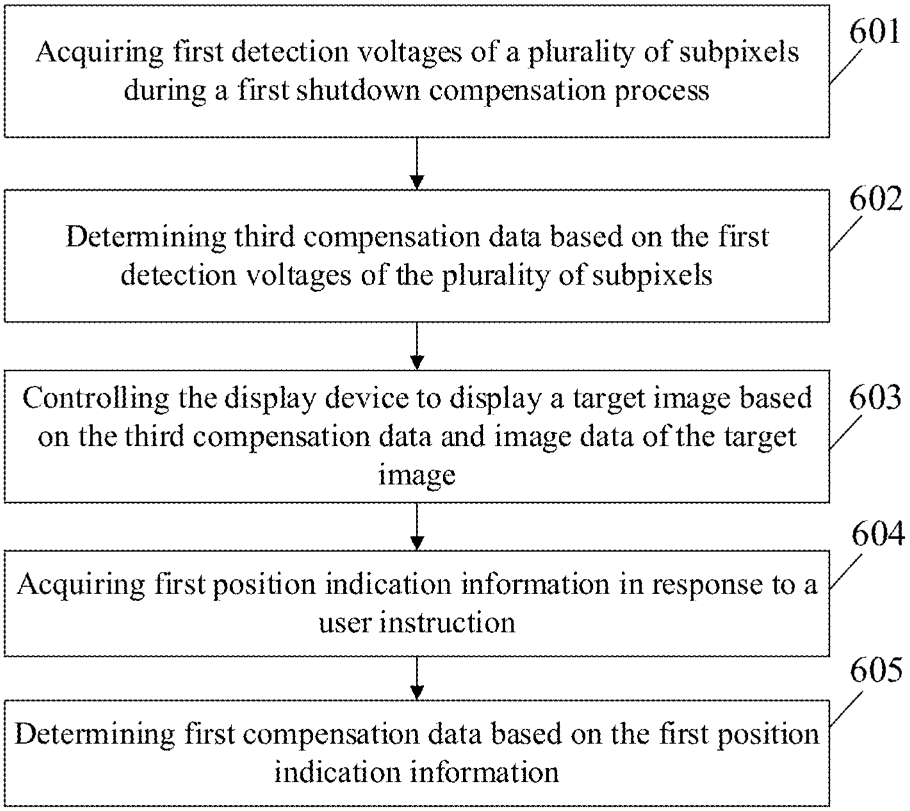
FIG. 6 is a flowchart of still another compensation method for a display device according to some embodiments of the present disclosure.

FIG. 6 is a flowchart of still another compensation method for a display device according to some embodiments of the present disclosure. Referring to FIG. 6, the method is performed by a control unit, such as a TCON, of the display device. The method includes the following steps.

In step 601, first detection voltages of a plurality of subpixels are acquired during a first shutdown compensation process.

For the meanings of the first shutdown compensation process, the plurality of subpixels, and the first detection voltage herein, references are made to the descriptions in step 301, which are not repeated herein.

In step 602, third compensation data is determined based on the first detection voltages of the plurality of subpixels.

In step 603, the display device is controlled to display a target image based on the third compensation data and image data of the target image.

The target image herein is the test image.

In step 604, first position indication information is acquired in response to a user instruction.

The user instruction herein is generated based on a position of a luminance anomaly line in the target image. For the meaning of the first position information, reference is made to the description in step 302, which is not repeated herein.

In some embodiments, the first position indication information is acquired in response to the user instruction according to the following steps.

In a first step, a cursor is moved in the target image in response to a user operation.

In a second step, the user instruction is received.

The user instruction herein indicates that a position of a subpixel corresponding to the cursor is determined as the first position indication information. Exemplarily, in response to the user operation, the cursor is moved to the position of the luminance anomaly line in the target image, a distance between the position of the luminance anomaly line and a border of the target image is measured based on the movement of the cursor, and the position is converted to a pixel position based on the distance and a pixel resolution of the target image.

In step 605, first compensation data is determined based on the first position indication information.

The first compensation data is determined in step 605 in the same way as in step 403, which is not repeated herein.

In the embodiments of the present disclosure, the process flow of the display device is simplified by moving the cursor to acquire the first position indication information in response to the user operation. The first compensation data is determined based on the first position indication information, such that it is not necessary to perform the shutdown compensation process several times, and thus the process of the compensation data consumes less time.

It should be noted that the compensation method illustrated in FIG. 6 is performed in the case where the number of times the shutdown compensation process is performed in the compensation method illustrated in FIG. 5 reaches a defined number of times but the luminance abnormal line is still present. Alternatively, without relying on the compensation method illustrated in FIG. 5, the compensation method illustrated in FIG. 6 is performed in the case where a luminance abnormal line is present in an image displayed by the display device.

Figure 7:
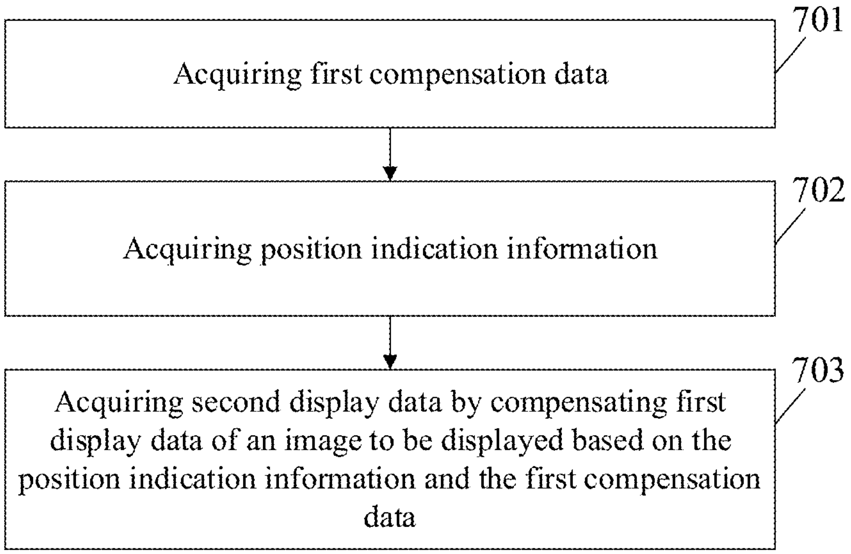
FIG. 7 is a flowchart of still another compensation method for a display device according to some embodiments of the present disclosure.

FIG. 7 is a flowchart of still another compensation method for a display device according to some embodiments of the present disclosure. As illustrated in FIG. 7, the method is performed by a control unit, such as TCON, of the display device. The method includes the following steps.

In step 701, first compensation data is acquired.

The first compensation data is acquired by the display device in a first shutdown compensation process. The first compensation data includes first threshold compensation voltages of a plurality of first subpixels and first threshold compensation voltages of a plurality of second subpixels. The plurality of first subpixels are connected to a first detection line, and the plurality of second subpixels are connected to a second detection line adjacent to the first detection line. An absolute value of a difference between the first threshold compensation voltage of the first subpixel and the first threshold compensation voltage of the second subpixel is greater than a voltage threshold.

The first threshold compensation voltage of the first subpixel is an abnormal voltage, and an absolute value of a difference between the first threshold compensation voltage of the first subpixel and a target threshold voltage of a drive TFT of the first subpixel is greater than a first defined value. The first threshold compensation voltage of the second subpixel is a normal voltage, and an absolute value of a difference between the first threshold compensation voltage of the second subpixel and a target threshold voltage of a drive TFT of the second subpixel is less than or equal to a second defined value. The target threshold voltages of the drive TFTs of the subpixels are close to each other, and thus the absolute value of the difference between the first threshold compensation voltage of the first subpixel and the first threshold compensation voltage of the second subpixel is greater than the voltage threshold.

In step 702, position indication information is acquired.

The position indication information indicates column positions of pixels to which the plurality of first subpixels belong.

In some embodiments, the position indication information is acquired as follows.

During the first shutdown compensation process, in the case that an absolute value of a difference between a detection voltage of a first target subpixel and a detection voltage of two second target subpixels are both greater than a threshold, a column position of a pixel to which the first target subpixel belongs is saved as the position indication information. Pixels to which the two second target subpixels belong are in the same row as the pixel to which the first target subpixel belongs, and the two second target subpixels are connected to two detection lines adjacent to the first detection line. Alternatively, the position indication information is generated in response to a user instruction. The user instruction is generated based on a position of a luminance anomaly line in a target image, and the target image is an image displayed by the display device upon the completion of the first shutdown compensation process.

In step 703, second display data is acquired by compensating first display data of an image to be displayed based on the position indication information and the first compensation data.

The first display data includes first data voltages of the plurality of subpixels, and the second display data includes second data voltages of the plurality of subpixels. In the second display date, an absolute value of a difference between a second data voltage of the first subpixel and a first data voltage of the first subpixel is less than an absolute value of the first threshold compensation voltage.

In some embodiments, the second data voltage of the first subpixel is determined according to any of the following.

The second data voltage of the first subpixel is acquired by compensating the first data voltage of the first subpixel using a first threshold compensation voltage of a subpixel which is in the same row as the first subpixel and connected to a detection line adjacent to the first detection line.

The second data voltage of the first subpixel is acquired by compensating the first data voltage of the first subpixel using a second threshold compensation voltage of the first subpixel. The second threshold compensation voltage of the first subpixel is acquired by the display device in a second shutdown compensation process. The second shutdown compensation process is prior to the first shutdown compensation process, and the positions corresponding to the pixels to which the plurality of first subpixels belong do not generate the luminance anomaly lines during the process that the display device employs the second compensation data for the compensation.

In some embodiments, a second data voltage of the second subpixel is acquired by compensating a first data voltage of the second subpixel using the first threshold compensation voltage of the second subpixel.

Figure 8:
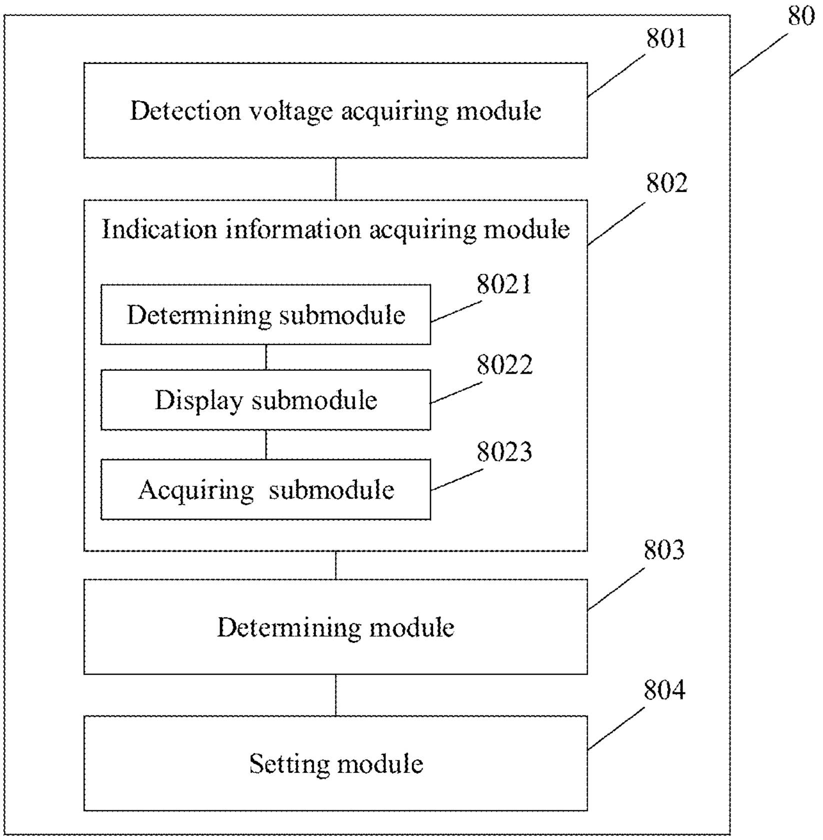
FIG. 8 is a structural schematic diagram of a compensation apparatus for a display device according to some embodiments of the present disclosure.

FIG. 8 is a structural schematic diagram of a compensation apparatus for a display device according to some embodiments of the present disclosure. As illustrated in FIG. 8, the apparatus 80 includes a detection voltage acquiring module 801, an indication information acquiring module 802, and a determining module 803.

The detection voltage acquiring module 801 is configured to acquire first detection voltages of a plurality of subpixels during a first shutdown compensation process.

The indication information acquiring module 802 is configured to acquire first position indication information based on the first detection voltages of the plurality of subpixels. The first position indication information indicates column positions of pixels to which a plurality of first subpixels in the plurality of subpixels belong. The plurality of first subpixels are connected to a first detection line, and an absolute value of a difference between the first detection voltage of any of first subpixels and a first detection voltage of a second subpixel is greater than a first threshold. The second subpixel is a subpixel connected to a second detection line adjacent to the first detection line.

The determining module 803 is configured to determine first compensation data based on the first position indication information. The first compensation data includes first threshold compensation voltages of the plurality of subpixels. In the first compensation data, an absolute value of a difference between the first threshold compensation voltage of the first subpixel and a first reference value is less than an absolute value of a difference between a second threshold compensation voltage of the first subpixel and the first reference value. The first reference value is a threshold voltage of a drive thin film transistor of the first subpixel, and the second threshold compensation voltage of the first subpixel is calculated based on the first detection voltage of the first subpixel.

In some embodiments, the indication information acquiring module 802 is configured to determine a column position of a pixel to which a first target subpixel belongs as the first position indication information in the case that an absolute value of a difference between a first detection voltage of the first target subpixel and first detection voltages of two second target subpixels are both greater than a first threshold. The first target subpixel is any one of the plurality of subpixels, and the pixels to which the two second target subpixels belong are in the same row as the pixel to which the first target subpixel belongs, and the two second target subpixels are respectively connected to two detection lines adjacent to the first detection line.

In some embodiments, the detection voltage acquiring module 801 is further configured to acquire second detection voltages of the plurality of subpixels during a second shutdown compensation process. The second shutdown compensation process follows the first shutdown compensation process.

The indication information acquiring module 802 is further configured to determine a column position of a pixel to which a third target subpixel belongs as second position indication information in the case that an absolute value of a difference between a second detection voltage of the third target subpixel and second detection voltages of two fourth target subpixels are both greater than a second threshold. The third target subpixel is any one of the plurality of subpixels, and the third target subpixel is connected to a third detection line. Pixels to which the two fourth target subpixels belong are in the same row as the pixel to which the third target subpixel belongs, and the two fourth target subpixels are connected to two detection lines adjacent to the third detection line, and the second threshold is less than the first threshold.

The determining module 803 is further configured to determine second compensation data based on the second position indication information. The second compensation data includes third threshold compensation voltages of the plurality of subpixels. in the second compensation data, an absolute value of a difference between a third threshold compensation voltage of the third target subpixel and a second reference value is less than an absolute value of a difference between a fourth threshold compensation voltage of the third target subpixel and the second reference value. The second reference value is a threshold voltage of a drive thin film transistor of the third target subpixel. The fourth threshold compensation voltage of the third target subpixel is calculated based on the second detection voltage of the third target subpixel.

In some embodiments, the apparatus 80 further includes a setting module 804, configured to set the second threshold in response to a setting instruction. The setting instruction is received by a remote control device or a button of the display device.

In some embodiments, the indication information acquiring module 802 includes a determining submodule 8021, a display submodule 8022, and an acquiring submodule 8023. The determining submodule 8021 is configured to determine third compensation data based on the first detection voltages of the plurality of subpixels. The display submodule 8022 is configured to control the display device to display a target image based on the third compensation data and image data of the target image. The acquiring submodule 8023 is configured to acquire the first position indication information in response to a user instruction, wherein the user instruction is generated based on a position of a luminance anomaly line in the target image.

In some embodiments, the acquiring submodule 8023 is configured to move a cursor in the target image in response to a user operation and to receive a user instruction, wherein the user instruction is configured to determine a position of a subpixel corresponding to the cursor as the first position indication information.

In some embodiments, the determining module 803 determines the first compensation data using any of the following approaches.

In a first approach, the first threshold compensation voltage of the first subpixel is calculated based on a first detection voltage of a subpixel which is in the same row as the first subpixel and connected to a detection line adjacent to the first detection line.

In a second approach, the first threshold compensation voltage of the first subpixel is calculated based on an average value of first detection voltages of at least two subpixels that are in the same row as the first subpixel and connected to at least two detection lines adjacent to the first detection line.

In a third approach, a first threshold compensation voltage of a subpixel which is in the same row as the first subpixel and connected to a detection line adjacent to the first detection line is determined as the first threshold compensation voltage of the first subpixel.

In a fourth approach, an average of first threshold compensation voltages of at least two subpixels that are in the same row as the first subpixel and connected to at least two detection lines adjacent to the first detection line is determined as the first threshold compensation voltage of the first subpixel.

In a fifth approach, a third threshold compensation voltage of the first subpixel during a third shutdown compensation process is determined as the first threshold compensation voltage of the first subpixel. The third shutdown compensation process is prior to the first shutdown compensation process, and an absolute value of a difference between a third threshold compensation voltage of the first subpixel and the first reference value upon the third shutdown compensation process is less than the absolute value of the difference between the second threshold compensation voltage of the first subpixel and first reference value.

Figure 9:
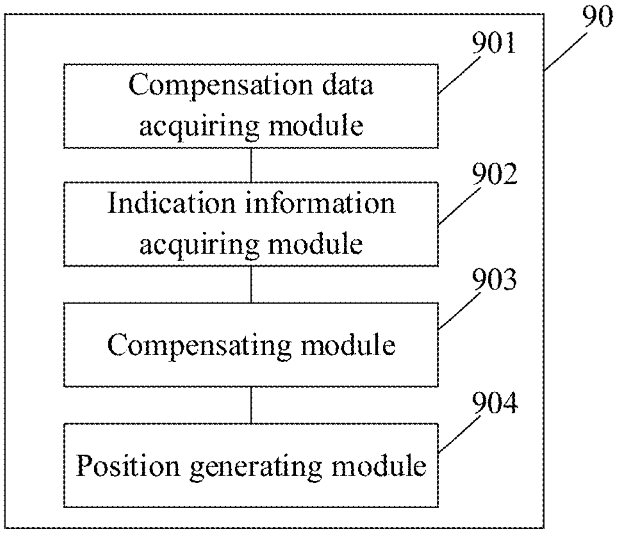
FIG. 9 is a structural schematic diagram of another compensation apparatus for a display device according to some embodiments of the present disclosure.

FIG. 9 is a structural schematic diagram of another compensation apparatus for a display device according to some embodiments of the present disclosure. As illustrated in FIG. 9, the apparatus 90 includes a compensation data acquiring module 901, an indication information acquiring module 902, and a compensating module 903.

The compensation data acquiring module 901 is configured to acquire first compensation data, wherein the first compensation data is acquired by the display device in a first shutdown compensation process. The first compensation data includes first threshold compensation voltages of a plurality of first subpixels and first threshold compensation voltages of a plurality of second subpixels. The plurality of first subpixels are connected to a first detection line, and the plurality of second subpixels are connected to a second detection line adjacent to the first detection line. An absolute value of a difference between the first threshold compensation voltage of the first subpixel and the first threshold compensation voltage of the second subpixel is greater than a voltage threshold. The indication information acquiring module 901 is configured to acquire position indication information. The position indication information indicates column positions of pixels to which the plurality of first subpixels belong. The compensating module 903 is configured to acquire second display data by compensating first display data of an image to be displayed based on the position indication information and the first compensation data. The first display data includes first data voltages of the plurality of subpixels, and the second display data includes second data voltages of the plurality of subpixels. An absolute value of a difference between a second data voltage of the first subpixel in the second display data and a first data voltage of the first subpixel difference is less than an absolute value of the first threshold compensation voltage.

In some embodiments, the apparatus 90 further includes a position generating module 904. The position generating module 904 is configured to save, during the first shutdown compensation process in the case that absolute values of differences between a detection voltage of a first target subpixel and detection voltages of two second target subpixels are both greater than a threshold, a column position of a pixel to which the first target subpixel belongs as position indication information, wherein pixels to which the two second target subpixels belong are in the same row as the pixel to which the first target subpixel belongs, and the two second target subpixels are connected to two detection lines adjacent to the first detection line; or to generate the position indication information in response to a user instruction, wherein the user instruction is generated based on a position of a luminance anomaly line in a target image, and the target image is an image displayed by the display device upon the completion of the first shutdown compensation process.

In some embodiments, the compensating module 903 is configured to compensate display data of the image to be displayed based on the position indication information and the first compensation data, including determining the second data voltage of the first subpixel using any of the following.

The second data voltage of the first subpixel is acquired by compensating the first data voltage of the first subpixel using a first threshold compensation voltage of a subpixel which is in the same row as the first subpixel and connected to a detection line adjacent to the first detection line.

The second data voltage of the first subpixel is acquired by compensating the first data voltage of the first subpixel using a second threshold compensation voltage of the first subpixel. The second threshold compensation voltage of the first subpixel is acquired by the display device in a second shutdown compensation process. The second shutdown compensation process is prior to the first shutdown compensation process. The positions corresponding to the plurality of first subpixels do not generate the luminance anomaly lines during a process that the display device employs the second compensation data for the compensation.

It should be noted that in the case that the compensation apparatus for the display device according to the above embodiments performs the compensation on the display device, description is only given to the above division of the functional modules. The above functions of the apparatus may be distributed to different functional modules according to actual needs. That is, an internal structure of the apparatus is divided into different functional modules to implement a part or all of the functions as described above. In addition, the compensation apparatus for the display device according to the above embodiments is based on the same concept as the compensation method for the display device as described above, and the specific implementation process thereof is detailed in the method embodiments, which is not repeated herein.

The division of the modules in the embodiments of the present disclosure is schematic and is only a logical functional division, and there can be another division when actually achieved. In addition, the various functional modules in the various embodiments of the present disclosure can be integrated into a single processor, can exist physically separately, or can be integrated in two or more modules into a single module. The integrated modules described above can be implemented either in the form of hardware or in the form of software function modules.

The integrated module, when implemented in the form of a software function module and sold or used as a stand-alone product, may be stored in a computer-readable storage medium. Based on this understanding, the technical solution of the present disclosure in essence, or a portion thereof that contributes to the related art, or all or part thereof, may be embodied in the form of a software product. The computer software product is stored in a storage medium and includes one or more instructions to cause a terminal device (which may be a personal computer, a smartphone, or a communication device) or a processor to perform all or part of the steps of the method of various embodiments of the present disclosure. The storage medium includes a USB flash drive, a removable hard disk, a read-only memory (ROM), a random access memory (RAM), a diskette, a CD-ROM, or other media that store program codes.

Some embodiments of the present disclosure provide a compensation apparatus for a display device. The apparatus includes one or more processors and one or more memories, wherein the one or more memories store at least one program code therein. The at least one program code, when loaded and executed by the one or more processors, causes the processor to perform a compensation method for any of the above display devices.

Figure 10:
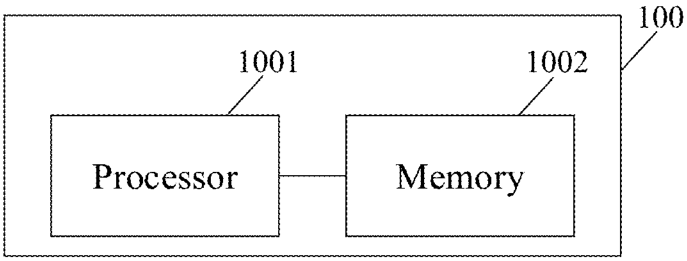
FIG. 10 is a structural schematic diagram of still another compensation apparatus for a display device according to some embodiments of the present disclosure.

FIG. 10 is a structural schematic diagram of still another compensation apparatus for a display device according to some embodiments of the present disclosure. The apparatus 100 includes a processor 1001 and a memory 1002.

The processor 1001 includes one or more processing cores, such as a 4-core processor and an 8-core processor. The processor 1001 is implemented using at least one of the hardware forms of a digital signal processing (DSP), a field-programmable gate array (FPGA), a programmable logic array (PLA). The processor 1001 includes a main processor and a co-processor. The main processor is a processor, also referred to as a central processing unit (CPU), for processing data in a wake-up state, and the co-processor is a low-power processor for processing data in a standby state.

The memory 1002 includes one or more computer-readable storage media, which may be non-transitory. The memory 1002 further includes a high-speed random access memory, and a non-volatile memory, such as one or more disk storage devices and flash memory storage devices. In some embodiments, the non-transitory computer-readable storage medium in the memory 1002 is used to store at least one instruction. The at least one instruction, when loaded and executed by the processor 1001, causes the processor to perform the compensation method according to the method embodiments of the present disclosure.

Some embodiments of the present disclosure provide a computer-readable storage medium, storing at least one program code. The at least one program code, when loaded and executed by a processor, causes the processor to perform a compensation method for a display device as described above.

Some embodiments of the present disclosure provide a computer program product or a computer program, storing one or more computer instructions. The one or more computer instructions, when loaded and executed by a processor, cause the processor to perform a compensation method for a display device as described above.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A compensation method for a display device, wherein the display device comprises a plurality of detection lines and a plurality of pixels arranged in arrays, each of the detection lines being connected to a column of pixels of the plurality of pixels, and each of the pixels comprising a plurality of subpixels;

the method comprising:

acquiring first detection voltages of the plurality of subpixels during a first shutdown compensation process;

acquiring first position indication information based on the first detection voltages of the plurality of subpixels, wherein the first position indication information indicates column positions of pixels to which a plurality of first subpixels of the plurality of subpixels belong, wherein the plurality of first subpixels are connected to a first detection line of the plurality of detection lines, and an absolute value of a difference between the first detection voltage of any of the plurality of first subpixels and a first detection voltage of a second subpixel is greater than a first threshold, the second subpixel being a subpixel connected to a second detection line adjacent to the first detection line; and determining first compensation data based on the first position indication information, wherein the first compensation data comprises first threshold compensation voltages of the plurality of subpixels, and an absolute value of a difference between the first threshold compensation voltage of the first subpixel and a first reference value is less than an absolute value of a difference between a second threshold compensation voltage of the first subpixel in the first compensation data and the first reference value, the first reference value being a threshold voltage of a drive thin film transistor of the first subpixel, and the second threshold compensation voltage of the first subpixel being calculated based on the first detection voltage of the first subpixel, wherein the determining the first compensation data based on the first position indication information comprises:

determining the first threshold compensation voltage of the first subpixel by determining a third threshold compensation voltage of the first subpixel during a third shutdown compensation process as the first threshold compensation voltage of the first subpixel, wherein the third shutdown compensation process is prior to the first shutdown compensation process, and an absolute value of a difference between a third threshold compensation voltage of the first subpixel upon the third shutdown compensation process and the first reference value is less than the absolute value of the difference between the second threshold compensation voltage of the first subpixel and the first reference value.

2. The method according to claim 1, wherein acquiring the first position indication information based on the first detection voltages of the plurality of subpixels comprises:

in response to absolute values of differences between a first detection voltage of a first target subpixel and first detection voltages of two second target subpixels being both greater than the first threshold, determining a column position of a pixel to which the first target subpixel belongs as the first position indication information, wherein the first target subpixel is any of the plurality of subpixels, pixels to which the two second target subpixels belong and the pixel to which the first target pixel belongs are in a same row, and the two second target subpixels are respectively connected to two detection lines adjacent to the first detection line.

3. The method according to claim 2, further comprising:

acquiring second detection voltages of the plurality of subpixels during a second shutdown compensation process, wherein the second shutdown compensation process follows the first shutdown compensation process;

in response to absolute values of differences between a second detection voltage of a third target subpixel and second detection voltages of two fourth target subpixels being both greater than a second threshold, determining a column position of a pixel to which the third target subpixel belongs as second position indication information, wherein the third target subpixel is any of the plurality of subpixels, the third target subpixel is connected to a third detection line of the plurality of detection lines, pixels to which the two fourth target subpixels belong and the pixel to which the third target subpixel belongs are in a same row, the two fourth target subpixels are respectively connected to two detection lines adjacent to the third detection line, and the second threshold is less than the first threshold; and determining second compensation data based on the second position indication information, wherein the second compensation data comprises third threshold compensation voltages of the plurality of subpixels, and an absolute value of a difference between a third threshold compensation voltage of the third target subpixel in the second compensation data and a second reference value is less than an absolute value of a difference between a fourth threshold compensation voltage of the third target subpixel and the second reference value, the second reference value being a threshold voltage of a drive thin film transistor of the third target subpixel, and the fourth threshold compensation voltage of the third target subpixel being calculated based on the second detection voltage of the third target subpixel.

4. The method according to claim 3, further comprising:

setting the second threshold in response to a setting instruction, wherein the setting instruction is received by a remote control device or a button of the display device.

5. The method according to claim 1, wherein acquiring the first position indication information based on the first detection voltages of the plurality of subpixels comprises:

determining third compensation data based on the first detection voltages of the plurality of subpixels;

controlling, based on the third compensation data and image data of a target image, the display device to display the target image; and acquiring the first position indication information in response to a user instruction, wherein the user instruction is generated based on a position of a luminance anomaly line in the target image.

6. The method according to claim 5, wherein acquiring the first position indication information in response to the user instruction comprises:

moving a cursor in the target image in response to a user operation; and receiving the user instruction, wherein the user instruction indicates that a position of a subpixel corresponding to the cursor is determined as the first position indication information.

7. A non-volatile non-transitory computer-readable storage medium, storing at least one computer program, wherein the at least one computer program, when loaded and run on a computer, causes the computer to perform the compensation method as defined in any one of claims 1 to 6, or to perform the compensation method as defined in claim 1.

8. A compensation method for a display device, wherein the display device comprises a plurality of detection lines and a plurality of pixels arranged in arrays, each of the detection lines being connected to a column of pixels of the plurality of pixels, and each of the pixels comprising a plurality of subpixels;

the method comprising:

acquiring first compensation data, wherein the first compensation data is acquired by the display device in a first shutdown compensation process, and the first compensation data comprises first threshold compensation voltages of a plurality of first subpixels and first threshold compensation voltages of a plurality of second subpixels, wherein the plurality of first subpixels are connected to a first detection line, and the plurality of second subpixels are connected to a second detection line adjacent to the first detection line, an absolute value of a difference between the first threshold compensation voltage of the first subpixel and the first threshold compensation voltage of the second subpixel being greater than a voltage threshold;

acquiring position indication information, wherein the position indication information indicates column positions of pixels to which the plurality of first subpixels belong; and acquiring second display data by compensating, based on the position indication information and the first compensation data, first display data of an image to be displayed, wherein the first display data comprises first data voltages of the plurality of subpixels, and the second display data comprises second data voltages of the plurality of subpixels, an absolute value of a difference between a second data voltage of the first subpixel in the second display data and a first data voltage of the first subpixel being less than an absolute value of the first threshold compensation voltage, wherein the compensating, based on the position indication information and the first compensation data, the first display data of the image to be displayed comprises:

determining the second data voltage of the first subpixel by compensating the first data voltage of the first subpixel using a second threshold compensation voltage of the first subpixel, wherein the second threshold compensation voltage of the first subpixel is acquired by the display device in a second shutdown compensation process, the second shutdown compensation process being prior to the first shutdown compensation process, and during a process of compensation by the display device using second compensation data, luminance anomaly lines are not generated at positions corresponding to the pixels to which the plurality of first subpixels belong.

9. The compensation method according to claim 8, further comprising:

during the first shutdown compensation, in response to absolute values of differences between a detection voltage of a first target subpixel and detection voltages of two second target subpixels being both greater than a threshold, saving a column position of a pixel to which the first target subpixel belongs as the position indication information, wherein pixels to which the two second target subpixels belong are in a same row as the pixel to which the first target subpixel belongs, and the two second target subpixels are connected to two detection lines adjacent to the first detection line; or generating the position indication information in response to a user instruction, wherein the user instruction is generated according to a position of a luminance anomaly line in a target image, the target image being an image displayed by the display device upon the first shutdown compensation process.

10. A compensation apparatus for a display device, comprising: one or more processors and one or more memories, wherein the one or more memories store at least one program code therein, wherein the at least one program code, when loaded and executed by the one or more processors, causes the one or more processors to perform the compensation method as defined in claim 8.

11. A non-volatile non-transitory computer-readable storage medium, storing at least one computer program, wherein the at least one computer program, when loaded and run on a computer, causes the computer to perform the compensation method as defined in claim 8.

12. A compensation apparatus for a display device, comprising: one or more processors and one or more memories, wherein the one or more memories store at least one program code therein, wherein the at least one program code, when loaded and executed by the one or more processors, causes the one or more processors to perform:

acquiring first detection voltages of a plurality of subpixels during a first shutdown compensation process;

acquiring first position indication information based on the first detection voltages of the plurality of subpixels, wherein the first position indication information indicates column positions of pixels to which a plurality of first subpixels of the plurality of subpixels belong, wherein the plurality of first subpixels are connected to a first detection line of a plurality of detection lines, and an absolute value of a difference between the first detection voltage of any of the plurality of first subpixels and a first detection voltage of a second subpixel is greater than a first threshold, the second subpixel being a subpixel connected to a second detection line adjacent to the first detection line; and determining first compensation data based on the first position indication information, wherein the first compensation data comprises first threshold compensation voltages of the plurality of subpixels, and an absolute value of a difference between the first threshold compensation voltage of the first subpixel and a first reference value is less than an absolute value of a difference between a second threshold compensation voltage of the first subpixel in the first compensation data and the first reference value, the first reference value being a threshold voltage of a drive thin film transistor of the first subpixel, and the second threshold compensation voltage of the first subpixel being calculated based on the first detection voltage of the first subpixel, wherein the determining the first compensation data based on the first position indication information comprises:

determining the first threshold compensation voltage of the first subpixel by determining a third threshold compensation voltage of the first subpixel during a third shutdown compensation process as the first threshold compensation voltage of the first subpixel, wherein the third shutdown compensation process is prior to the first shutdown compensation process, and an absolute value of a difference between a third threshold compensation voltage of the first subpixel upon the third shutdown compensation process and the first reference value is less than the absolute value of the difference between the second threshold compensation voltage of the first subpixel and the first reference value.

13. The compensation apparatus for the display device according to claim 12, wherein the at least one program code, when loaded and executed by the one or more processors, causes the one or more processors to perform:

in response to absolute values of differences between a first detection voltage of a first target subpixel and first detection voltages of two second target subpixels being both greater than the first threshold, determining a column position of a pixel to which the first target subpixel belongs as the first position indication information, wherein the first target subpixel is any of the plurality of subpixels, pixels to which the two second target subpixels belong and the pixel to which the first target pixel belongs are in a same row, and the two second target subpixels are respectively connected to two detection lines adjacent to the first detection line.

14. The compensation apparatus for the display device according to claim 13, wherein the at least one program code, when loaded and executed by the one or more processors, causes the one or more processors to perform:

acquiring second detection voltages of the plurality of subpixels during a second shutdown compensation process, wherein the second shutdown compensation process follows the first shutdown compensation process;

in response to absolute values of differences between a second detection voltage of a third target subpixel and second detection voltages of two fourth target subpixels being both greater than a second threshold, determining a column position of a pixel to which the third target subpixel belongs as second position indication information, wherein the third target subpixel is any of the plurality of subpixels, the third target subpixel is connected to a third detection line of the plurality of detection lines, pixels to which the two fourth target subpixels belong and the pixel to which the third target subpixel belongs are in a same row, the two fourth target subpixels are respectively connected to two detection lines adjacent to the third detection line, and the second threshold is less than the first threshold; and determining second compensation data based on the second position indication information, wherein the second compensation data comprises third threshold compensation voltages of the plurality of subpixels, and an absolute value of a difference between a third threshold compensation voltage of the third target subpixel in the second compensation data and a second reference value is less than an absolute value of a difference between a fourth threshold compensation voltage of the third target subpixel and the second reference value, the second reference value being a threshold voltage of a drive thin film transistor of the third target subpixel, and the fourth threshold compensation voltage of the third target subpixel being calculated based on the second detection voltage of the third target subpixel.

15. The compensation apparatus for the display device according to claim 14, wherein the at least one program code, when loaded and executed by the one or more processors, causes the one or more processors to perform:

setting the second threshold in response to a setting instruction, wherein the setting instruction is received by a remote control device or a button of the display device.

16. The compensation apparatus for the display device according to claim 12, wherein the at least one program code, when loaded and executed by the one or more processors, causes the one or more processors to perform:

determining third compensation data based on the first detection voltages of the plurality of subpixels;

controlling, based on the third compensation data and image data of a target image, the display device to display the target image; and acquiring the first position indication information in response to a user instruction, wherein the user instruction is generated based on a position of a luminance anomaly line in the target image.

* * * * *